United States Patent
Barak et al.

(10) Patent No.: US 11,543,294 B2
(45) Date of Patent: Jan. 3, 2023

(54) OPTICAL TECHNIQUE FOR MATERIAL CHARACTERIZATION

(71) Applicant: NOVA LTD., Rehovot (IL)

(72) Inventors: Gilad Barak, Rehovot (IL); Yonatan Oren, Kiryat Ono (IL)

(73) Assignee: NOVA LTD., Rehovot (IL)

( * ) Notice: Subject to any disclaimer, the term of this patent is extended or adjusted under 35 U.S.C. 154(b) by 0 days.

(21) Appl. No.: 17/263,147

(22) PCT Filed: Jul. 25, 2019

(86) PCT No.: PCT/IL2019/050847
§ 371 (c)(1),
(2) Date: Jan. 25, 2021

(87) PCT Pub. No.: WO2020/021554
PCT Pub. Date: Jan. 30, 2020

(65) Prior Publication Data
US 2021/0293618 A1  Sep. 23, 2021

Related U.S. Application Data

(60) Provisional application No. 62/702,997, filed on Jul. 25, 2018.

(51) Int. Cl.
*G01J 3/44* (2006.01)
*G01J 3/02* (2006.01)
(Continued)

(52) U.S. Cl.
CPC ............ *G01J 3/0208* (2013.01); *G01J 3/0224* (2013.01); *G01J 3/06* (2013.01); *G01J 3/10* (2013.01);
(Continued)

(58) Field of Classification Search
CPC .... G01J 3/02; G01J 3/28; G01J 3/0208; G01J 3/0224; G01J 3/06; G01J 3/10;
(Continued)

(56) References Cited

U.S. PATENT DOCUMENTS 6,038,026 A * 3/2000 Maris .................. G01B 11/303
356/514

FOREIGN PATENT DOCUMENTS

KR     20150101110     9/2015

OTHER PUBLICATIONS

Christensen, Kenneth A., and Michael D. Morris. "Hyperspectral Raman microscopic imaging using Powell lens line illumination." Applied spectroscopy 52, No. 9 (Nov. 9, 1998): 1145-1147. KA Christensen Nov. 9, 1998 (Nov. 9, 1998).

* cited by examiner

*Primary Examiner* — Abdullahi Nur
(74) *Attorney, Agent, or Firm* — Reches Patents

(57) ABSTRACT

A polarized Raman Spectrometric system for defining parameters of a polycrystaline material, the system comprises a polarized Raman Spectrometric apparatus, a computer-controlled sample stage for positioning a sample at different locations, and a computer comprising a processor and an associated memory. The polarized Raman Spectrometric apparatus generates signal(s) from either small sized spots at multiple locations on a sample or from an elongated line-shaped points on the sample, and the processor analyzes the signal(s) to define the parameters of said polycrystalline material.

14 Claims, 8 Drawing Sheets

(51) Int. Cl.
    *G01J 3/06*     (2006.01)
    *G01J 3/10*     (2006.01)
    *G01J 3/28*     (2006.01)

(52) U.S. Cl.
    CPC ........... *G01J 3/2803* (2013.01); *G01J 3/2823* (2013.01); *G01J 3/44* (2013.01); *G01J 2003/283* (2013.01)

(58) Field of Classification Search
    CPC .......... G01J 3/2803; G01J 3/2823; G01J 3/44; G01J 2003/283; G01J 3/024; G01J 3/027; G01N 21/21; G01N 21/65
    See application file for complete search history.

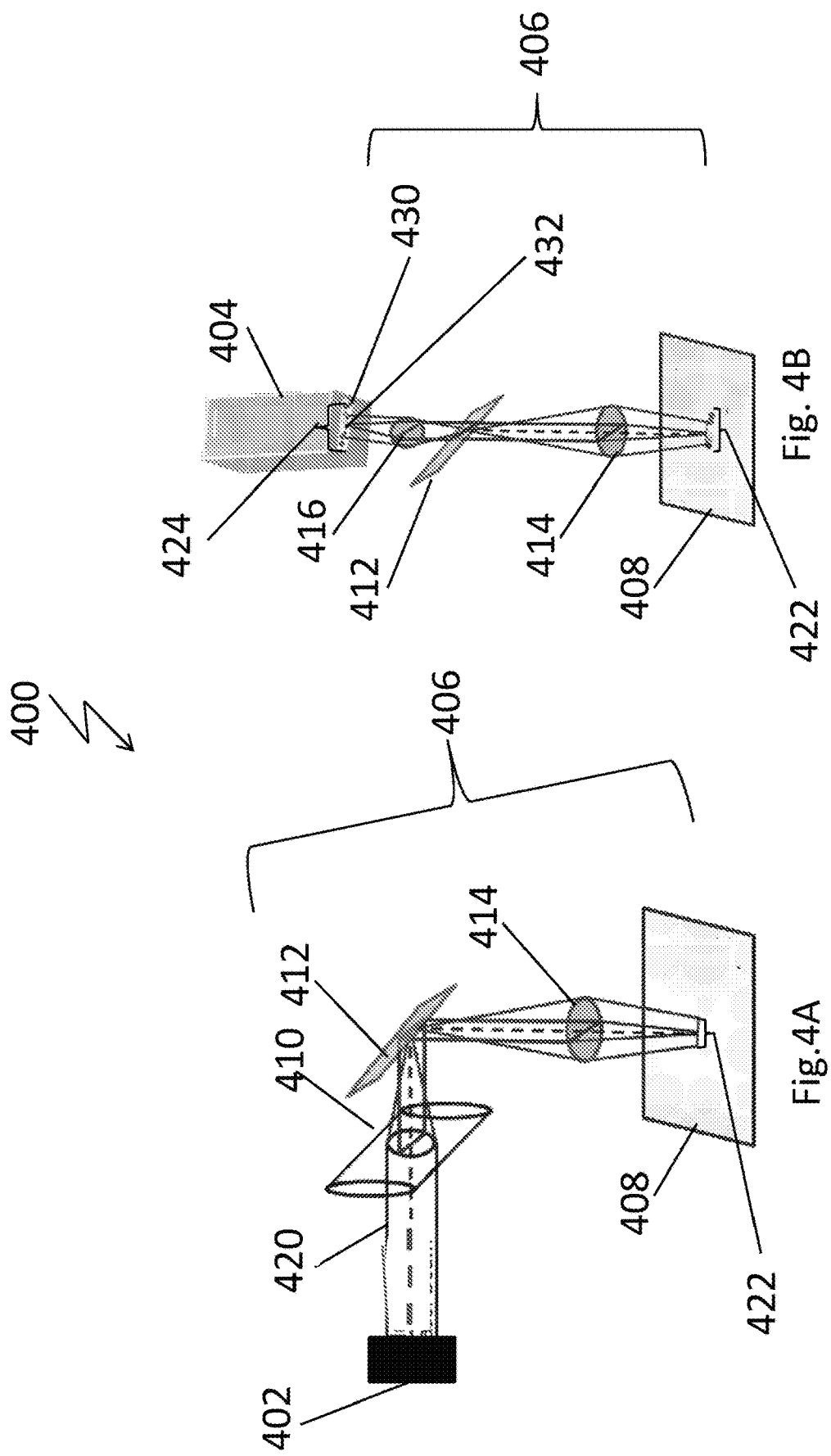

502 — Providing a Raman spectrometric system with a high numerical aperture optical system to allow efficient collection of the Raman signal from multiple positions in a single measurements, in relatively short acquisition times

504 — Using the Raman system with an optical component for diverging a light beam in one axis to form an elongated line-shaped points on the sample

506 — Running high-resolution polarized Raman measurements to generate a 2D image of lines that are directly related to the line-shaped points on the sample and getting Raman peaks at these points

Fig. 5

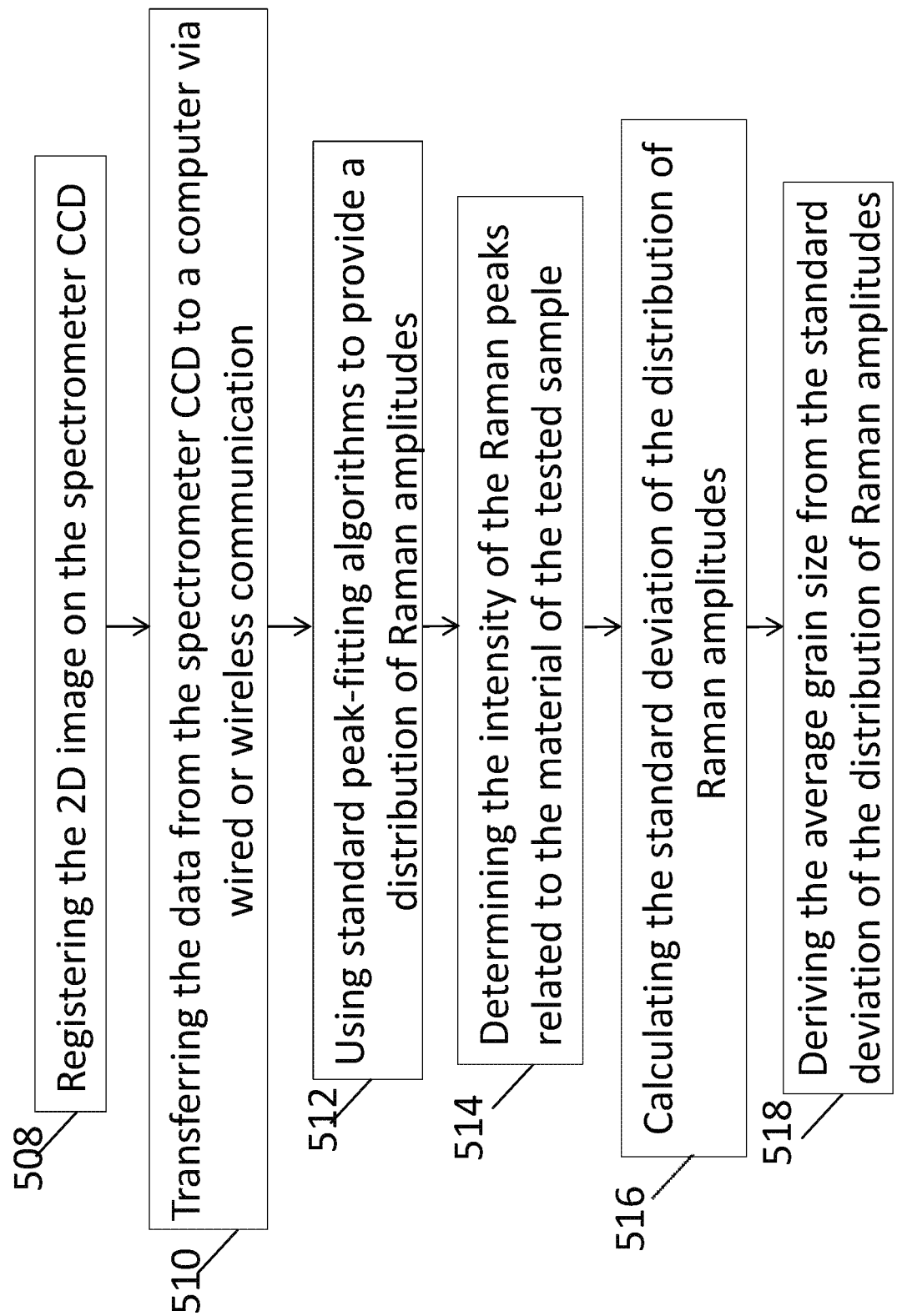
Fig. 5 (continue)

OPTICAL TECHNIQUE FOR MATERIAL CHARACTERIZATION

FIELD OF THE INVENTION

The present invention relates to a system and method for characterizing crystalline materials. More specifically, the present invention relates a to system and method for defining parameters of crystalline materials.

BACKGROUND

Polycrystalline material is a widespread form of matter of great practical use in many industries. An accurate metrology and control over grain dimensions is often required to guarantee suitable characteristics of the polycrystalline material. One clear example for such situation is the use of polycrystalline materials in the semiconductor industry, where they are used in numerous process steps and as multiple functions, in front-end, back-end, logic and memory products.

The polycrystalline material is built out of multiple nanocrystals ('grains'), each of which is comprised of the atomic configuration of the perfect crystal, but with varying orientations. The average dimensions of these grains can affect the material's properties such as conductivity, phase diagram, thermal response, mechanical behavior and also impact the overall device performance.

Unfortunately, the determination of average grain dimensions is a complicated technological task, often requiring the use of destructive techniques such as transmission electron microscopy which in addition to being destructive and extremely slow can only sample an extremely small region at a time (of few microns), preventing good statistical feedback.

Another useful method is X-Ray Diffraction (XRD). XRD results are, however, highly qualitative and considered inaccurate, and often very difficult to interpret.

Therefore, a fast, non-destructive technology, which could be adopted for in-line metrology, allowing grain size determination is required.

SUMMARY OF THE INVENTION

The present invention is of a Polarized Raman spectroscopic system and method for defining parameters of a polycrystalline material via (a) a dedicated hardware configuration, (b) a specific measurement sequence, and (c) an interpretation method.

The present invention relies on the fact that Polarized Raman spectroscopy of crystalline materials is extremely sensitive to the crystal orientation, in the sense that the intensity of the polarized Raman signal strongly depends on the orientation of the crystal.

Thus, in accordance with some embodiments of the present invention, there is provided a polarized Raman Spectrometric system for defining parameters of a polycrystalline material. The system comprises:
  a polarized Raman Spectrometric apparatus,
  a computer-controlled sample stage for positioning a sample at different locations, and
  a computer comprising a processor and an associated memory,
    wherein said polarized Raman Spectrometric apparatus generates signal(s) from either small sized spots at multiple locations on a sample, or from an elongated line-shaped points on said sample, and said processor analyzes said signal(s) to define the parameters of said polycrystalline material.

Furthermore, in accordance with some embodiments of the present invention, one of the parameters of said polycrystalline material is an average grain size.

Furthermore, in accordance with some embodiments of the present invention, the polarized Raman Spectrometric apparatus used for generating the signal(s) from said elongated line-shaped points comprises:
  a light source for generating a light beam,
  a detection unit including a spectrometer,
  an optical system comprised of multiple lenses including an objective lens and a line-spot element for shaping an illumination spot so as to project said elongated line-shaped points on said sample,
  a 2-D image sensor connected to said spectrometer, said 2-D image sensor receives said elongated line-shaped points from said spectrometer and creates a 2D image of lines that are directly related to the points on the sample.

Furthermore, in accordance with some embodiments of the present invention, the line-spot element is selected from a cylindrical lens, a holographic optical element, and a micro-lens array.

Furthermore, in accordance with some embodiments of the present invention, the optical system is a high numerical aperture (NA) to allow collection of the signal(s) from multiple locations in a single measurement.

Furthermore, in accordance with some embodiments of the present invention, the numerical aperture is adjustable to vary the dimensions of said elongated line-shaped points on the sample.

Furthermore, in accordance with some embodiments of the present invention, the processor uses the 2D image of lines created by said 2-D image sensor for (i) retrieving Raman peaks from said 2D image of said lines; (ii) generating a distribution of Raman amplitudes; (iii) determining the intensity of the Raman peaks related to said material; (iv) calculating the standard deviation from the distribution of Raman amplitudes of said Raman peaks; and (v) calculating the average grain size therefrom.

Furthermore, in accordance with some embodiments of the present invention, the polarized Raman Spectrometric apparatus used for generating the signal(s) from said small spots at multiple locations on said sample comprises:
  a light source for generating a light beam,
  a detection unit including a spectrometer, and
  an optical system comprised of multiple lenses including an objective lens.

Furthermore, in accordance with some embodiments of the present invention, the optical system is a high numerical aperture (NA) which leads to said small-sized spots.

Furthermore, in accordance with some embodiments of the present invention, the numerical aperture is adjustable to vary the size of said small-sized spots on the sample.

Furthermore, in accordance with some embodiments of the present invention, the numerical aperture is adjustable via a variable aperture positioned at the back-focal-plane of said objective lens.

Furthermore, in accordance with some embodiments of the present invention, the sample stage is translated along the X-Y axes for positioning the sample at multiple locations, thus, for collecting signals from multiple locations of said small spots.

Furthermore, in accordance with some embodiments of the present invention, scanning said light beam enables collecting signals from the small spots at multiple locations on said sample.

Furthermore, in accordance with some embodiments of the present invention, the processor uses the signal(s) detected via said detection unit for (i) retrieving Raman peaks from said 2D image of said lines; (ii) generating a distribution of Raman amplitudes; (iii) determining the intensity of the Raman peaks related to said material; (iv) calculating the standard deviation from the distribution of Raman amplitudes of said Raman peaks; and (v) calculating the average grain size therefrom.

Furthermore, in accordance with some embodiments of the present invention, there is provided a method for defining parameters of a polycrystalline material. The method comprising:
(i) providing the above-described Polarized Raman Spectrometric system,
(ii) generating plurality of signals from either small spots at multiple locations on a sample or from an elongated line-shaped points on said sample, and
(iii) analyzing said plurality of signals to define the parameters of said polycrystalline material.

Furthermore, in accordance with some embodiments of the present invention, the method comprising defining an average grain size of said polycrystalline material.

Furthermore, in accordance with some embodiments of the present invention, generating signal(s) from said small spots at multiple locations comprising translating said sample stage along the X-Y axes of said stage for positioning the sample at multiple locations, thus, for collecting signals from multiple locations on the sample.

Furthermore, in accordance with some embodiments of the present invention, generating signal(s) from said small spots at multiple locations comprising scanning a light beam for collecting signals from multiple locations on the sample.

Furthermore, in accordance with some embodiments of the present invention, when generating signal(s) from an elongated line-shaped points on said sample, the method further comprising: (i) creating a 2D image of lines, (ii) retrieving Raman peaks from said 2D image of said lines; (iii) generating a distribution of Raman amplitudes; (iii) determining the intensity of the Raman peaks related to said material; (iv) calculating the standard deviation from the distribution of Raman amplitudes of said Raman peaks; and (v) calculating the average grain size therefrom.

Furthermore, in accordance with some embodiments of the present invention, when generating signal(s) from said small spots at multiple locations on said sample, the method further comprising: (i) detecting said signal(s), (ii) retrieving Raman peaks from said signal(s); (ii) generating a distribution of Raman amplitudes; (iii) determining the intensity of the Raman peaks related to said material; (iv) calculating the standard deviation from the distribution of Raman amplitudes of said Raman peaks; and (v) calculating the average grain size therefrom.

BRIEF DESCRIPTION OF THE FIGURES

Disclosed embodiments will be understood and appreciated more fully from the following detailed description taken in conjunction with the appended figures. The drawings included and described herein are schematic and are not limiting the scope of the disclosure. It is also noted that in the drawings, the size of some elements may be exaggerated and, therefore, not drawn to scale for illustrative purposes. The dimensions and the relative dimensions do not necessarily correspond to actual reductions to practice of the disclosure.

FIGS. 4A-D illustrate a Polarized Raman Spectrometric apparatus for taking single-shot spatially-resolved Raman measurements at a set of sample points on a sample in accordance with some embodiments of the present invention.

FIG. 5 is a schematic diagram of a computerized method for probing the average grain dimensions by taking single-shot spatially-resolved Raman measurements at a set of sample points on a sample according to some embodiments of the present invention.

DETAILED DESCRIPTION OF THE INVENTION

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

The term "comprising", used in the claims, is "open ended" and means the elements recited, or their equivalent in structure or function, plus any other element or elements which are not recited. It should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a system comprising x and z" should not be limited to systems consisting only of components x and z. Also, the scope of the expression "a method comprising the steps x and z" should not be limited to methods consisting only of these steps.

As used herein, the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached to", "connected to", "coupled with", "contacting", etc., another element, it can be directly on, attached to, connected to, coupled with or contacting the other element or intervening elements may also be present.

In contrast, when an element is referred to as being, for example, "directly on", "directly attached to", "directly connected to", "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Figure 1B:
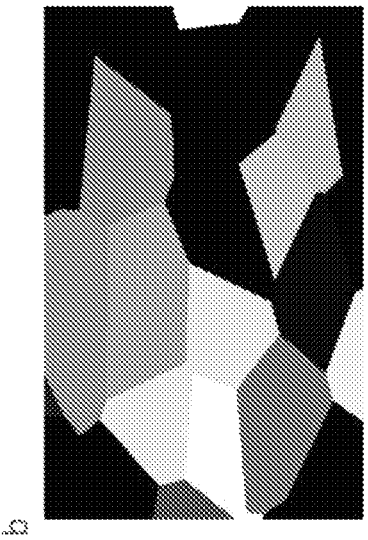
FIGS. 1A&B illustrate Raman imaging's for large-scale grains.
Figure 1A:
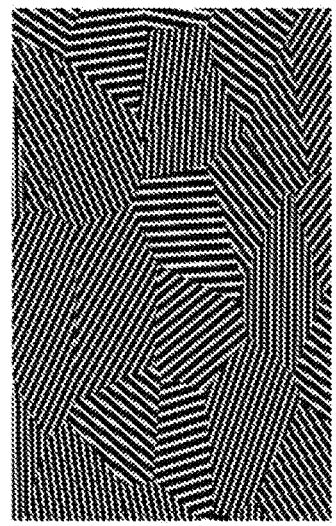

FIGS. 1A&B illustrate Raman imaging's for large-scale grains, grains larger than ~1 µm. The figures illustrate a polycrystalline material comprised of multiple regions, each structured as a crystal domain, but with varying orientations (crystal orientation is depicted as the direction of lines inside the grain region).

As seen in the figures, when the grains are large enough to be optically resolved, a polarized Raman image can be taken, to provide direct mapping of the grains orientation. The Raman signal can be tuned to be highly sensitive to the crystal orientation by correct choice of the illumination and collection polarizations.

However, it is almost always the case that grain dimensions are significantly smaller than the optical resolution, hindering such a direct method.

Thus, the present invention provides a polarized Raman Spectroscopic system and method for resolving and defining parameters of grains smaller than 1 µm.

The polarized Raman Spectroscopic system, in accordance with some embodiments of the present invention, is comprised of a polarized Raman Spectrometric apparatus, a computer-controlled sample stage for positioning a sample at different locations, and a computer comprising a processor and an associated memory.

The polarized Raman Spectrometric apparatus comprises a light source for generating a light beam, a detection unit including a spectrometer, and an optical system comprised of multiple lenses including an objective lens.

In accordance with some embodiments of the present invention, the apparatus further comprises multiple polarizers for polarizing the illuminating light beam and the detected beam.

In accordance with some embodiments of the present invention, in order to collect signals at multiple locations on the sample, either the sample stage is translated along the X-Y axes to position the sample at multiple locations, or the point illumination is scanned across the sample.

FIGS. 2A-D illustrate the principles behind the system and method used for probing the average grain dimensions according to some embodiments of the present invention.

Figure 2A:
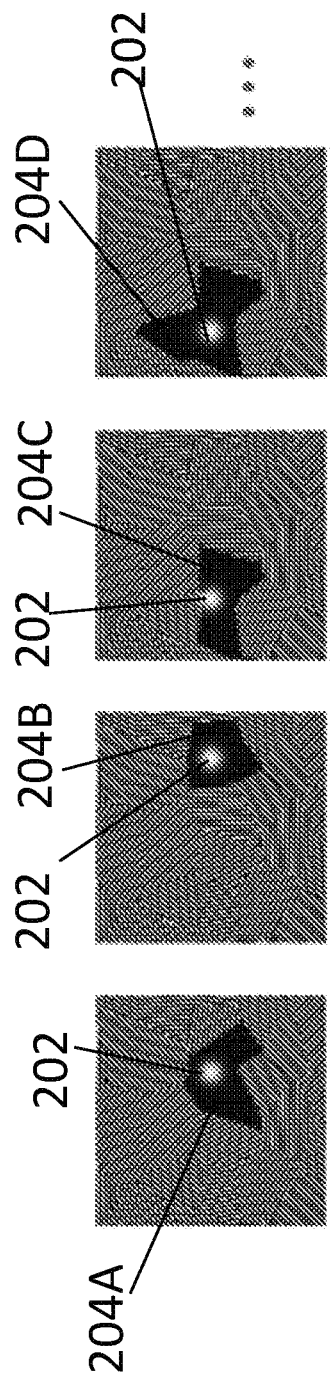
FIGS. 2A-D illustrate the principles behind the system and method used for probing the average grain dimensions according to some embodiments of the present invention.
Figure 2B:
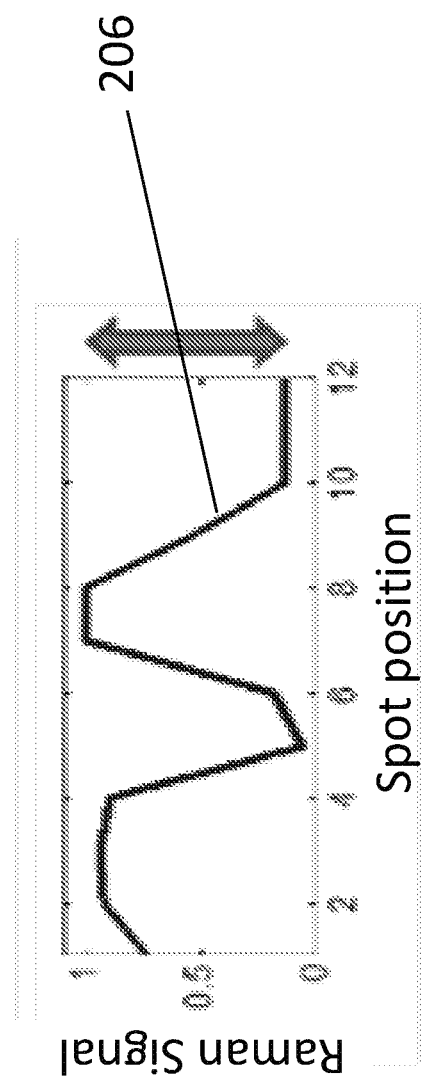

FIGS. 2A-B illustrate a case of large-grains, namely, grain dimensions that are comparable to the illumination spot size 202. In this case, at each measurement location, a small number of grains, e.g., grains within darker regions 204A-D, contributes to the measured signal 206. As seen in FIG. 2B, the Raman signal varies significantly since the grains dimensions are comparable to the illumination spot size 202, and thus, the measurement averages over a small number of grain orientations.

Figure 2C:
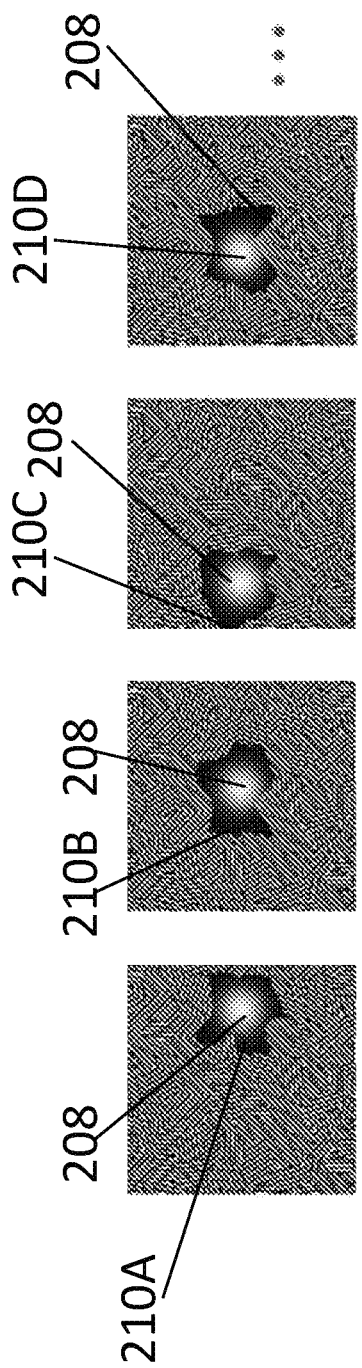
Figure 2D:
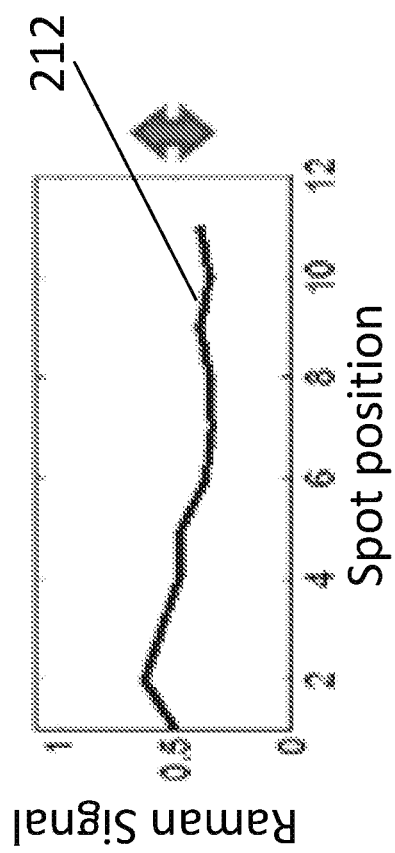

FIGS. 2C&D illustrate a case of small grains, namely, grains that are much smaller than the illumination spot size 208. In this case, each measurement averages over many grain orientations in regions 210A-D. Consequently, the Raman signal 208 shows small variations around its average value, and the grain dimensions can be deduced from the signal variance.

Figure 3:
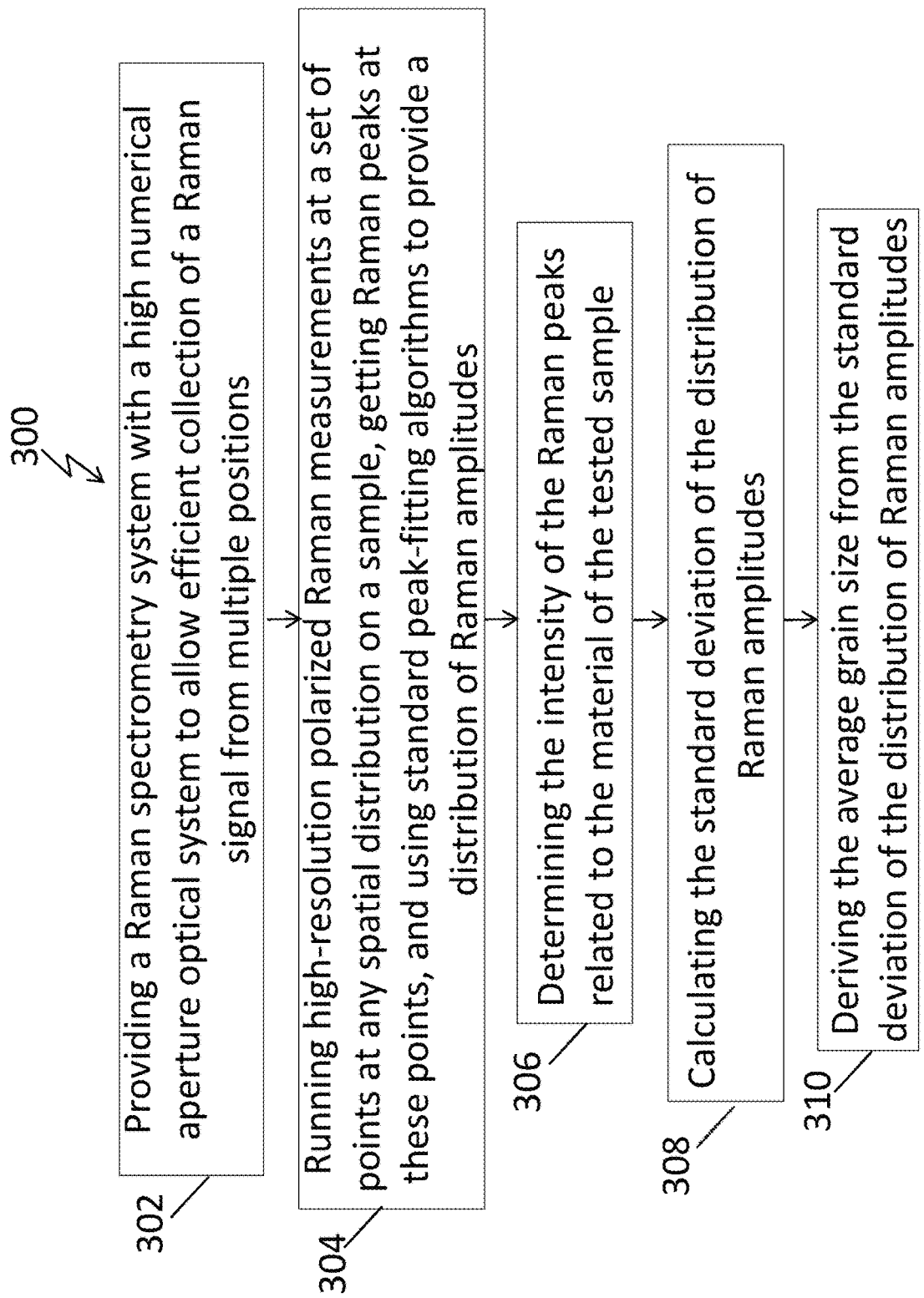
FIG. 3 is a schematic diagram of a computerized method for probing the average grain dimensions according to some embodiments of the present invention.

FIG. 3 is a schematic diagram of a computerized method 300 using a processor and associated memory for probing the average grain dimensions according to some embodiments of the present invention.

In accordance with some embodiments of the present invention, the method 300 is based on a point illumination which is scanned across the sample measuring one point at a time with a relatively high resolution and no cross-talk between measurements The method 300 comprises the following steps:

Step 302—Providing a Raman spectrometry system. In accordance with some embodiments of the present invention, the Raman Spectrometric System is provided with a high numerical (NA) aperture optical system to allow efficient collection of the Raman signal from multiple positions.

Step 304—Running high-resolution polarized Raman measurements at a set of points at any spatial distribution on a sample, getting Raman peaks at these points, and using standard peak-fitting algorithms to provide a distribution of Raman amplitudes.

Step 306—Determining the intensity of the Raman peaks related to the material of the tested sample.

Step 308—Calculating the standard deviation of the distribution of Raman amplitudes.

Step 310—Deriving the average grain size from the standard deviation of the distribution of Raman amplitudes.

By standard statistical considerations, an estimation for the average grain dimensions is given by $$\frac{\text{Variance of Raman signal}}{(\text{mean Raman signal})^2} \sim \frac{\text{grain size}}{\text{spot size}} \qquad \text{equation 1}$$

For a given crystal type, the Raman intensity is given by the Raman selection rule as follows:

$$I = |\underline{e}_s^T \cdot \leftrightarrow R \cdot \underline{e}_i|^2 \qquad \text{equation 2}$$

where the exact value of the proportionality factor depends on the assumption of a completely random grain orientations and of the distribution of Raman intensities induced by it.

$\leftrightarrow R$ is the so-called Raman Tensor associated with each vibration mode, and $\underline{e}_{i,\ s}$ are the incident and scattered electric field polarizations. For each grain in a polycrystalline material, the Raman tensor is rotated according to it's orientation.

If the orientation is represented by a rotation matrix $\leftrightarrow T_g$, the intensity from an ensemble of grains can be determined as follow:

$$I = \Sigma_g I_g |\underline{e}_s^T \cdot (\leftrightarrow T_g^T \leftrightarrow R \leftrightarrow T_g) \cdot \underline{e}_i|^2 \qquad \text{equation 3}$$

where $I_g$ is the intensity of the illumination spot at the corresponding grain.

By performing the summation, the spatial distribution of the spot and the orientational distribution of the grains can be related to a distribution of the observed intensity, and so to a concrete relation between the observed relative variance and grain size.

It should be noted that corrections to this estimator can be obtained by a one-time calibration—a sample with well-known grain size can be measured, and the proportionality constant between the Raman signal variance and grain size can be accurately obtained, accounting for any uncertainties in the illumination spot shape or other system parameters.

In accordance with some embodiments of the present invention, the following are several specific system aspects which are essential to this method:

Numerical aperture (NA):
(a) a high numerical aperture is essential in order to allow efficient collection of the Raman signal at short acquisition times. In the current context, the high-NA also leads to small spot size, as dictated by diffraction:

$$\text{Spot size} \sim \frac{\lambda}{NA}, \quad \text{equation 4}$$

where $\lambda$ is the wavelength. Consequently, high-NA allows characterization of smaller grain sizes.

It should be noted that equation 4 is simplified for clarity—for Raman metrology the illumination and collection wavelengths are slightly different, and the illumination and collection NA may be different.

(b) Controlling the illumination NA and\or collection NA impact the measured spot size, i.e., it is possible to vary the number of grains inside the spot, and consequently affect the grain statistics. Specifically, measurements can be taken at a set of distinct values of NA (illumination and\or collection) where for each configuration the spot size can be calculated and the grain size can be deduced from equation 1. This approach presents an alternative to the discussed method of scanning the spot over different locations and may be advantageous in cases when the measured structure resides in a small area, preventing such scanning approach.

In accordance with some embodiments of the present invention, such method may be implemented by placing a variable aperture at the back-focal-plane of the objective (at illumination and/or collection paths) and controlled electronically.

Another implementation of direct benefit for this measurement is the use of multi-wavelength Raman spectroscopy. By using a set of different excitation wavelength, it is possible to change the spot size (see Eq. 2). Thus, using a set of measurements with different spot sizes, for instance, controlled by the excitation wavelength, it is possible to analyze how Raman signal varies with different grain statistics, and deduce the average grain size.

An additional implementation which can improve throughput and performance is angle resolved Raman Spectroscopy. By controlling the illumination angle-of-incidence, and separating the collected signal coming from different scattering angles, multiple views of the same spot are recorded and can be combined to gather more information from a single measurement and thus reduce the number of required measurements and improve the measurement stability.

In accordance with some embodiments of the present invention, an optical arrangement of special benefit in this method is the use of single-shot spatially-resolved Raman imaging. This approach involves the following:

An illumination spot shaped so as to project an elongated line on the sample. This can be achieved by the addition of a 'line-spot' element such as a cylindrical lens, a holographic optical element, micro-lens array or others.

The 'line spot' element is aligned so that the elongated direction points along the spectrometer slit direction, or close to this direction. Consequently, the measured signal on a 2-D sensor, such as a spectrometer charge coupled device (CCD), involves a set of Raman spectra, corresponding to different locations along the illuminated spot.

the 2D image on the spectrometer CCD is registered. Each CCD line holds the Raman spectrum corresponding to a different location on the sample.

In accordance with some embodiments of the present invention, such implementation enables the acquisition of Raman spectra from multiple positions in a single measurement, not requiring any motion of the sample or scanning the illumination point across the sample, and grain dimensions may be derived from the statistical distribution of these different Raman spectra.

Such implementation is illustrated in FIGS. 4 and 5.

FIGS. 4A-D illustrate a Polarized Raman Spectrometric apparatus 400 for taking single-shot spatially-resolved Raman measurements at a set of sample points on a sample in accordance with some embodiments of the present invention.

Raman Spectrometric system 400 comprises a light source 402, a detection unit including a spectrometer 404, an optical system 406 configured as light directing arrangement for directing light from the light source 402 towards a sample 408 and directing the returned light from the sample 408 to the spectrometer 404, and single or multiple polarizers (not seen in the figure) for polarizing the illuminating light beam and the detected beam.

The optical system 406 comprises a line-spot element 210, beam splitter 412, objective lens unit 414 (one or more lenses) and focusing lens 416.

The spectrometer 404 generates spectral data of light incident thereon, and the output of the spectrometer 404 is transferable to a computer via wired or wireless communication, e.g., via Wi-Fi or Bluetooth, or a combination thereof.

FIG. 4A is a schematic illustration of an illumination path in the Raman Spectrometric system 400 according to some embodiments of the present invention. Seen in the figure, a laser beam 420 generated via light source 402 is passed through 'line-spot' element 410, which creates an elongated line-spot 422 on the sample 408.

The 'line-spot' element 410 may be selected from a cylindrical lens, a holographic optical element, a micro-lens array or any other suitable optical component.

As seen in FIG. 4A, 'line-spot' element 410 creates beam divergence in one axis to form an elongated line-spot 422 on the sample 408 while leaving the beam 420 unaffected in the other axis. Beam splitter 412 reflects the beam towards the objective lens unit 414, which focuses it on the sample 408. As seen in the figure, due to the beam divergence in one axis, elongated line-spot 422 is created on the sample 408.

FIG. 4B is a schematic illustration of a collection path according to some embodiments of the present invention. Seen in the figure, light emerging from the sample 408 passes through objective lens unit 414 and beam splitter 412 and focused by a focusing lens 416 onto the spectrometer slit 430 of spectrometer 404. In this layout, the line-shaped points 422 on sample 408 is imaged onto the spectrometer slit 430, e.g., line-shaped points 432, which is used to schematically demonstrate this imaging layout.

Figure 4D:
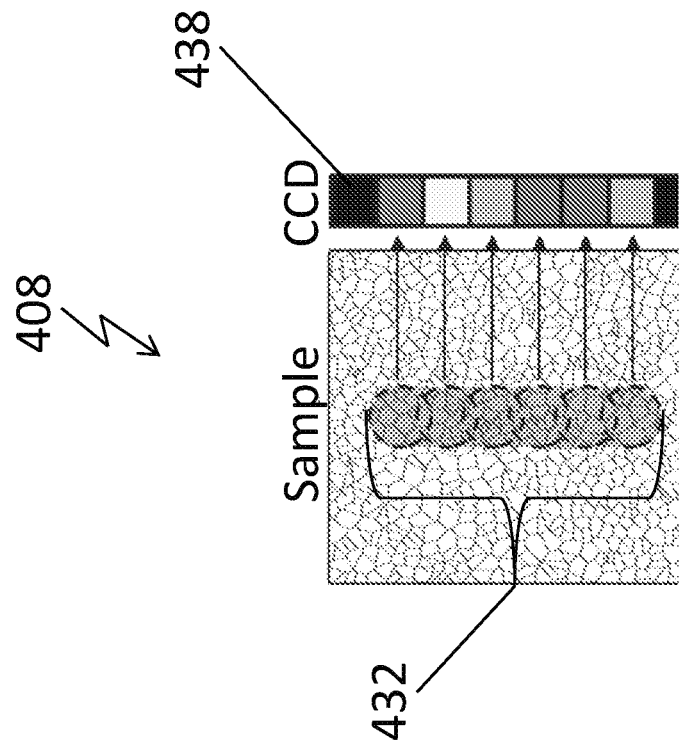
Figure 4C:
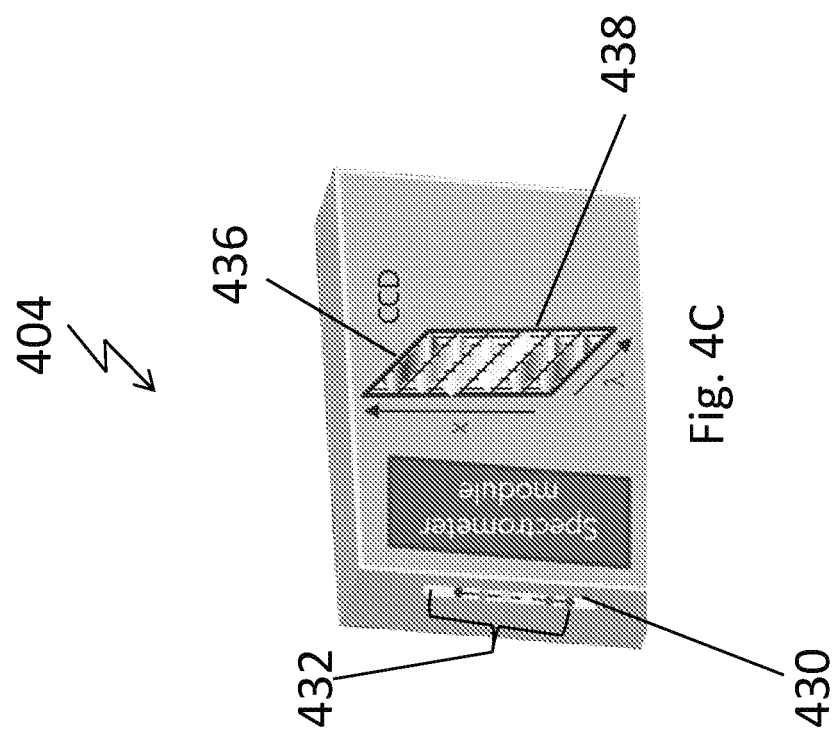

Spectrometer 404 is illustrated in FIG. 4C, and the sample 408, is illustrated in FIG. 4D. Seen in FIG. 4C, the line-shaped points 432 on the spectrometer slit 430 are spectrally resolved, to create a 2D image 436 on the CCD 438. Image 436 is hence directly related to the line-shaped points 422 on the sample 408.

In accordance with some embodiments of the present invention, the 2D image 436 yields the position-dependence spectra, e.g., one axis corresponds to the wavelength and the other axis to the position on the sample.

The measured sample 408, is illustrated in FIG. 4D. As seen in the figure, different parts of the line-shaped points 432 are imaged to different lines of the CCD 438, where they can be separately read and analyzed.

FIG. 5 is a schematic diagram of a computerized method 500 for probing the average grain dimensions by taking single-shot spatially-resolved Raman measurements at a set of sample points on a sample according to some embodiments of the present invention.

Method 500 comprises the following steps:

Step 502—Providing a Raman Spectrometric System including the Raman Spectroscopic apparatus of FIGS. 4A-D. In accordance with some embodiments of the present invention, the Raman Spectrometric apparatus is provided with a high numerical (NA) aperture optical system to allow efficient collection of the Raman signal from multiple positions in a single measurement and in a relatively short acquisition time.

Using such implementation, Raman spectra from multiple positions can be acquired in a single measurement, not requiring any motion of the measurement spot or sample, and grain dimensions are derived from the statistical distribution of these different Raman spectra.

Step 504—Using the Raman spectroscopic system to form an elongated line-shaped points on a sample.

The line-shaped points are aligned along the spectrometer slit direction, or close to this direction. Consequently, the measured signal on the spectrometer CCD involves a set of Raman spectra, corresponding to different locations along the illuminated spot.

Step 506—Running high-resolution polarized Raman measurements to generate a 2D image of lines that are directly related to the line-shaped points on the sample and getting Raman peaks at these point. In accordance with some embodiments of the present invention, there is no need to map an image of the probed region, but rather take measurements at sample points.

The measurements should be close enough together as to represent a localized measurement where the average grain dimensions are stationary.

Step 508—Registering the 2D image on the spectrometer CCD.

Contrary to standard Raman measurements, in this layout the 2D image on the spectrometer CCD is registered, and each CCD line holds the Raman spectrum corresponding to a different location on the sample.

Step 510—Transferring the data from the CCD to a computer via wired or wireless communication.

Step 512—Using standard peak-fitting algorithms to provide a distribution of Raman amplitudes.

Step 514—Determining the intensity of the Raman peaks related to the material of the tested sample.

Step 516—Calculating the standard deviation of the distribution of Raman amplitudes.

Step 518—Deriving the average grain size from the standard deviation of the distribution of Raman amplitudes.

Statistical Accuracy:

In accordance with some embodiments of the present invention, the accuracy of the estimated grain size using the present system and method is dictated by the size of the measured statistical ensemble, i.e., the more measurement points acquired, the better is the statistical analysis and the more accurate is the estimated grain size. However, the size of the required statistical ensemble for a specific degree of convergence depends on the grain size, i.e., larger grains lead to larger statistical ensemble. Such dependence can lead to measurement instabilities, as the measurement performance may vary with respect to sample characteristics.

Additionally, the measured variance is also influenced by measurement errors such as photon shot noise and other noise sources. Such noise sources should either be made negligible relative to the grain-related variance (e.g., by controlling the acquisition time per position), or properly taken into account in the analysis.

In accordance with some embodiments of the present invention, such errors may be mitigated by analyzing the collected signal and noise during measurement, and estimating the statistical validity during data collection.

This way, standard statistical tests may be applied to the data and dictate whether additional measurements are required. Such approach may also serve to improve the measurement throughput, as acquisitions are only taken when needed, rather than 'wasted' in situations where statistics are satisfactory.

Such approach, and its variations, enables the following:
Non-contact, non-destructive measurements,
Small spot (<1-few microns), allowing measurement of small regions,
Potentially fast measurements: while Raman metrology is significantly slower than standard optical scatterometry methods (e.g. ellipsometry, reflectometry), it can be made significantly faster than x-ray or TEM based methods. By a correct choice of laser sources and high-efficiency optical layout and spectrometer, the Raman metrology may become efficient—as specific acquisition times greatly depend on the measured material and its Raman cross section, expected measurement times may be of tens of seconds or few minutes.
It should be noted that the material under consideration has to be a Raman-active material that provides a distinct peak (or a set of peaks) in the Raman spectrum, and the Raman signal can be tuned to be highly sensitive to the crystal orientation by tuning the illumination and collection polarizations.

We claim:

1. A polarized Raman Spectrometric system for defining parameters of a polycrystalline material, said system comprising:
a polarized Raman Spectrometric apparatus,
a computer-controlled sample stage for positioning a sample at different locations, and
a computer comprising a processor and an associated memory,
wherein said polarized Raman Spectrometric apparatus is configured to generate one or more signals from an elongated line-shaped points on said sample, and said processor analyzes said one or more signals to define the parameters of said polycrystalline material;
wherein said polarized Raman Spectrometric apparatus comprises:
a light source for generating a light beam;
a detection unit including a spectrometer;
an optical system comprised of multiple lenses including an objective lens and a line-spot element for shaping an illumination spot so as to project said elongated line-shaped points on said sample; and
a 2-D image sensor connected to said spectrometer, said 2-D image sensor receives said elongated line-shaped points from said spectrometer and creates a 2D image of lines that are directly related to the points on the sample.

2. The polarized Raman Spectrometric system of claim 1, wherein one of the parameters of said polycrystalline material is an average grain size.

3. The polarized Raman Spectrometric system of claim 1, wherein said line-spot element is selected from a cylindrical lens, a holographic optical element, and a micro-lens array.

4. The polarized Raman Spectrometric system of claim 1, wherein said optical system is a high numerical aperture (NA) to allow collection of the one or more from multiple locations in a single measurement.

5. The polarized Raman Spectrometric system of claim 4, wherein said numerical aperture is adjustable to vary the dimensions of said elongated line-shaped points on the sample.

6. The polarized Raman Spectrometric system of claim 5, wherein said numerical aperture is adjustable via a variable aperture positioned at the back-focal-plane of said objective lens.

7. The polarized Raman Spectrometric system of claim 1, wherein said processor uses the 2D image of lines created by said 2-D image sensor for (i) retrieving Raman peaks from said 2D image of said lines; (ii) generating a distribution of Raman amplitudes; (hi) determining the intensity of the Raman peaks related to said material; (iv) calculating the standard deviation from the distribution of Raman amplitudes of said Raman peaks; and (v) calculating the average grain size therefrom.

8. The polarized Raman Spectrometric system of claim 1, wherein said sample stage is translated along the X-Y axes.

9. The polarized Raman Spectrometric system of claim 1, wherein scanning said light beam enables collecting signals from the small spots at multiple locations on said sample.

10. A polarized Raman Spectrometric system for defining parameters of a polycrystalline material, said system comprising:
a polarized Raman Spectrometric apparatus;
a computer-controlled sample stage for positioning a sample at different locations; and
a computer comprising a processor and an associated memory;
wherein said polarized Raman Spectrometric apparatus comprises:
a light source for generating a light beam,
a detection unit including a spectrometer, and
an optical system comprised of multiple lenses including an objective lens;
wherein said polarized Raman Spectrometric apparatus generates one or more signals from small sized spots at multiple locations on a sample, and said processor analyzes said one or more signals to define the parameters of said polycrystalline material;
wherein said processor uses the one or more signals detected via said detection unit for (i) retrieving Raman peaks from said 2D image of said lines; (ii) generating a distribution of Raman amplitudes; (iii) determining the intensity of the Raman peaks related to said material; (iv) calculating the standard deviation from the distribution of Raman amplitudes of said Raman peaks; and (v) calculating the average grain size therefrom.

11. A method for defining parameters of a polycrystalline material, said method comprising:
(i) providing a Polarized Raman Spectrometric system; wherein the Polarized Raman Spectrometric system comprises: (i) a polarized Raman Spectrometric apparatus; (ii) a computer-controlled sample stage for positioning a sample at different locations, and (iii) a computer comprising a processor and an associated memory; wherein said polarized Raman Spectrometric apparatus generates one or more signals from either small sized spots at multiple locations on a sample, or from an elongated line-shaped points on said sample, and said processor analyzes said one or more signals to define the parameters of said polycrystalline material;
(ii) generating plurality of signals from either small spots at multiple locations on a sample or from an elongated line-shaped points on said sample, and
(iii) analyzing said plurality of signals to define the parameters of said polycrystalline material; and
wherein at least one of the following is true:
(i) when generating one or more signals from the elongated line-shaped points on said sample, the method further comprising: (i) creating a 2D image of lines, (ii) retrieving Raman peaks from said 2D image of said lines; (hi) generating a distribution of Raman amplitudes of the Raman peaks from said 21) image of said lines; (iii) determining the intensity of the Raman peaks from said 2D image of said lines related to said material; (iv) calculating the standard deviation from the distribution of Raman amplitudes of said Raman peaks from said 2D image of said lines; and (v) calculating the average grain size therefrom; or
(ii) when generating one or more signals from said small spots at multiple locations on said sample, the method further comprising: (i) detecting said one or more signals from said small spots, (ii) retrieving Raman peaks of said one or more signals from said small spots: (ii generating a distribution of Raman amplitudes of the Raman peaks of said one or more signals from said small spots; (iii) determining the intensity of the Raman peaks of said one or more signals from said small spots; related to said material; (iv) calculating the standard deviation from the distribution of Raman amplitudes of said Raman peaks of said one or more signals from said small spots; and (v) calculating the average grain size therefrom.

12. The method of claim 11, wherein said method comprising defining an average grain size of said polycrystalline material.

13. The method of claim 11, wherein generating the one or more signals from said small spots comprising translating said sample stage along the X-Y axes of said stage for positioning the sample at the multiple locations, thus, for collecting signals from the multiple locations.

14. The method of claim 11, wherein generating the one or more signals from said small spots comprising scanning a light beam for collecting signals from the multiple locations.

* * * * *